United States Patent
Ledieu et al.

(10) Patent No.: US 12,362,615 B2
(45) Date of Patent: Jul. 15, 2025

(54) ROTOR FOR AN ELECTRIC MOTOR PROVIDED WITH A COOLING CIRCUIT

(71) Applicant: NOVARES FRANCE, Clamart (FR)

(72) Inventors: Cédric Ledieu, Mont Saint Eloi (FR); Julien Brodnik, Loison sous Lens (FR)

(73) Assignee: NOVARES FRANCE, Clamart (FR)

( * ) Notice: Subject to any disclaimer, the term of this patent is extended or adjusted under 35 U.S.C. 154(b) by 147 days.

(21) Appl. No.: 17/928,469

(22) PCT Filed: May 20, 2021

(86) PCT No.: PCT/FR2021/050922
§ 371 (c)(1),
(2) Date: Nov. 29, 2022

(87) PCT Pub. No.: WO2021/240101
PCT Pub. Date: Dec. 2, 2021

(65) Prior Publication Data
US 2023/0223807 A1    Jul. 13, 2023

(30) Foreign Application Priority Data

May 29, 2020    (FR) ...................................... 2005689

(51) Int. Cl.
*H02K 1/32*    (2006.01)
*H02K 1/02*    (2006.01)
(Continued)

(52) U.S. Cl.
CPC .................. *H02K 1/32* (2013.01); *H02K 1/02* (2013.01); *H02K 1/276* (2013.01); *H02K 7/003* (2013.01)

(58) Field of Classification Search
CPC ............ H02K 1/32; H02K 1/02; H02K 1/276; H02K 7/003
See application file for complete search history.

(56) References Cited

U.S. PATENT DOCUMENTS 11,283,332 B2    3/2022    Kitao et al.
2009/0184592 A1*    7/2009    Sano ........................ H02K 9/19
310/90

FOREIGN PATENT DOCUMENTS

CN    108667180 A    * 10/2018
DE    112018003438 T5    4/2020
(Continued)

OTHER PUBLICATIONS

JP-2013115848-A_translate (Year: 2013).*
(Continued)

*Primary Examiner* — Tulsidas C Patel
*Assistant Examiner* — Mohammed Ahmed Qureshi
(74) *Attorney, Agent, or Firm* — CANTOR COLBURN LLP

(57) ABSTRACT

A rotor including a shaft mounted around an axis of rotation; —a laminated core mounted coaxially on the shaft, the laminated core extending between a front side face and a rear side face. It includes first internal cavities, a plurality of permanent magnets housed inside the first internal cavities, a front flange in the form of discs and arranged on either side of the laminated core. The shaft is provided with an internal inlet channel for circulating a coolant. The front or rear flange is configured to form, with the front or rear side face, at least one front outlet channel or rear outlet channel inside which a coolant is circulated. The front or rear outlet channel connected to the inlet channel opens at an outlet opening at the outer periphery of the front flange or rear flange.

20 Claims, 5 Drawing Sheets

(51) Int. Cl.
*H02K 1/276* (2022.01)
*H02K 7/00* (2006.01)

(56) References Cited

FOREIGN PATENT DOCUMENTS

| EP | 3382856 A1 | 10/2018 |
| JP | 2011142788 A | 7/2011 |
| JP | 2013115848 A * | 6/2013 |

OTHER PUBLICATIONS

CN-108667180-A_translate (Year: 2018).*
English Translation for International Search Report for corresponding International Application No. PCT/FR2021/050922; Date of Mailing: Sep. 20, 2021; (2 pages).
International Search Report for corresponding International Application No. PCT/FR2021/050922; Date of Mailing: Sep. 20, 2021; (5 pages).
Written Opinion of the International Searching Authority for International Applcaition No. PCT/FR2021/050922; Dated: May 29, 2020; (No English Translation) (10 pages).

* cited by examiner

ROTOR FOR AN ELECTRIC MOTOR PROVIDED WITH A COOLING CIRCUIT

CROSS REFERENCE TO RELATED APPLICATIONS

This application is a National Stage of PCT Application No. PCT/FR2021/050922 filed on May 20, 2021, which claims priority to French Patent Application No. 20/05689 filed on May 29, 2020, the contents each of which are incorporated herein by reference thereto.

TECHNICAL FIELD

The invention relates to a rotor for an electric motor arranged to allow a better removal of the heat generated during its operation. The invention also relates to an electric motor comprising such a rotor.

BACKGROUND

In general, the current electric motors include a rotor secured to a shaft and a stator which surrounds the rotor. The stator is mounted in a casing which includes bearings for the rotational mounting of the shaft. The rotor includes a body formed by a bundle of laminations or polar wheels (claw pole) held in the form of a stack by means of a suitable fastening system. The body of the rotor includes internal cavities housing permanent magnets. The stator includes a body consisting of a bundle of laminations forming a crown, the inner face of which is provided with teeth delimiting two by two a plurality of slots open towards the inside of the stator body and intended to receive phase windings. These phase windings pass through the slots of the stator body and form winding heads projecting on either side of the stator body. The phase windings may for example consist of a plurality of U-shaped conductor segments, the free ends of two adjacent segments being connected to each other by welding.

In the rotor, the lamination stack is axially clamped between a front flange and a rear flange which are mounted coaxially with the shaft. Each flange generally has the shape of a disc extending in a radial plane perpendicular to the axis of the shaft. Each flange includes a central orifice for the coaxial mounting on the shaft and several through holes intended to receive fastening screws passing axially through the entire lamination stack, said screws being secured to the flanges by means of nuts. The front and rear flanges are generally formed of a non-magnetic, heat-conducting material, for example a metal.

The casing generally includes front and rear bearings assembled together. The bearings define an internal cavity in which the rotor and the stator are housed. Each of the bearings centrally carries a ball bearing for the rotational mounting of the shaft of the rotor.

During the operation of the motor, the current flowing through the phase windings of the stator generates significant heat that must be removed. To cool the motor, there are currently several solutions. One of these solutions is to circulate oil through the shaft of the rotor and then to circulate this oil along the stator body so that it is in contact with the winding heads of the phase windings. This oil circulation may however prove difficult to achieve depending on the design of the balancing flange, in particular due to the presence of fins or nuts opposite the oil path, as well as only because of the problems of indexing the flange relative to the shaft. Such a solution, however, requires providing for numerous modifications in the structure of the motor, which makes it difficult to implement, and, therefore, relatively expensive.

BRIEF SUMMARY

The invention therefore aims to provide a rotor and an electric motor comprising such a rotor arranged to allow a better removal of the heat generated during its operation and does not have the disadvantages of the existing solutions described above.

This invention also makes it possible to use the same cooling circuit to cool both the permanent magnets of the stator and the winding heads of the stator of this electric motor.

To this end, the invention relates to a rotor for an electric motor comprising:
   a rotor shaft rotatably mounted about an axis;
   a lamination stack coaxially mounted on the rotor shaft, said lamination stack extending between a front lateral face and a rear lateral face and comprising first internal cavities;
   a plurality of permanent magnets housed inside the first internal cavities of the lamination stack;
   a front flange and a disc-shaped rear flange coaxially mounted on the rotor shaft and axially arranged on either side of the lamination stack so as to be contiguous respectively to the front and rear lateral faces of the lamination stack;
   characterized in that the shaft is provided with at least one internal channel for circulating a coolant, called an inlet channel, and in that the front flange, respectively the rear flange, is configured to form with the front lateral face, respectively the rear lateral face, of the lamination stack at least one front outlet channel, respectively at least one rear outlet channel, inside which a coolant may circulate, said at least one front, respectively rear, outlet channel being in fluid communication with the inlet channel, and opening at at least one outlet aperture located at the external periphery of said front flange, respectively of said rear flange.

Thus configured, the rotor of the invention will make it possible to better remove the heat generated in use, due to the passage of a coolant in the front and rear outlet channels formed inside the front and rear flanges and which are contiguous to the lamination stack and to the permanent magnets. Furthermore, said outlet channels opening at the external periphery of each of the flanges, the coolant can then be directed towards the winding heads of the stator by suitably positioning the outlet apertures provided at this level in each of the flanges. An additional heat removal can thus be obtained. Furthermore, circulating the coolant through the end flanges generates few modifications in the general structure of the electric motor and, therefore, offers a relatively inexpensive solution to the problem of heat removal in electric motors.

The rotor of the invention can also include one or more of the following characteristics:
   the shaft comprises a hollow front end portion and a solid rear end portion separated from the front end portion by a hollow central portion, the front end portion and the central portion being traversed by a cylindrically-shaped central cavity, said central cavity forming the inlet channel of the shaft, and in that at least one hole radially oriented with respect to the axis of the shaft is formed inside the front end portion, respectively the central portion, so as to open, on one side, into the inlet channel and, on the other side, into said at least one front outlet channel, respectively said at least one rear outlet channel.

the shaft comprises a main body provided with a blind hole aligned along the axis of the shaft, said blind hole comprising two contiguous sections with different internal diameters, namely a first section having a first internal diameter and a second section having a second internal diameter, the inlet channel of the shaft being jointly defined by the first section and by the second section of the blind hole.

each of the front and rear flanges has an internal face in contact with a lateral face of the lamination stack, said internal face being provided with at least one groove extending radially from a recessed central region of said flange, at which said groove is in fluid communication with the inlet channel of the shaft, to a peripheral face of said flange, said at least one groove forming with the corresponding lateral face of the lamination stack the front or rear outlet channel.

said at least one groove has a specific profile allowing it to optimize the contact surfaces between the front, respectively rear, outlet channel and the permanent magnets housed in the lamination stack.

said at least one groove is formed by a succession of contiguous radial and orthoradial segments, said segments defining a baffle profile intended to increase the path to be traveled by the coolant during its circulation in the front, respectively rear, outlet channel with respect to a path which would be radially direct between the central region and the peripheral face of said front, respectively rear, flange.

the internal face of the front, respectively rear, flange is provided with a plurality of grooves radially extending from a recessed central region of said front, respectively rear, flange, at which said grooves are in fluid communication with the inlet channel of the shaft, to a peripheral face of said front, respectively rear, flange, said grooves forming with the corresponding lateral face of the lamination stack a plurality of front, respectively rear, outlet channels.

each of said grooves faces a radial hole formed through the shaft, said radial hole opening, on one side, onto the inlet channel of the shaft and, on the other side, onto the peripheral wall of the shaft.

the permanent magnets are made of ferrite.

the permanent magnets are made of rare earth.

at least one of the front and rear flanges is produced from plastic.

The invention also relates to an electric motor comprising a rotor as defined above and an annular stator which surrounds the rotor coaxially with the shaft, winding heads axially projecting on either side of the stator, characterized in that the outlet aperture, respectively each of the outlet apertures, through which the coolant of the front and rear flanges exits, is aligned axially with the winding heads so as to allow said winding heads to be cooled by means of said coolant.

BRIEF DESCRIPTION OF THE DRAWINGS

The invention will be better understood upon reading the non-limiting following description, made with reference to the appended figures.

DETAILED DESCRIPTION

Throughout the description and in the claims, the terms "axial" and "radial" and their derivatives are defined with respect to the axis of rotation of the rotor. Thus, an axial orientation relates to an orientation parallel to the axis of rotation of the rotor and a radial orientation relates to an orientation perpendicular to the axis of rotation of the rotor. An orthoradial orientation relates to an orientation perpendicular to a radial orientation in a plane perpendicular to the axis of rotation of the rotor. Also, by convention, the terms "front" and "rear" refer to separate positions along the axis of rotation of the rotor. In particular, the "front" end of the shaft of the rotor corresponds to the end of the shaft on which a pulley, a pinion, a spline intended to transmit the rotational movement of the rotor to any other similar motion transmission device may be fastened.

Figure 1:
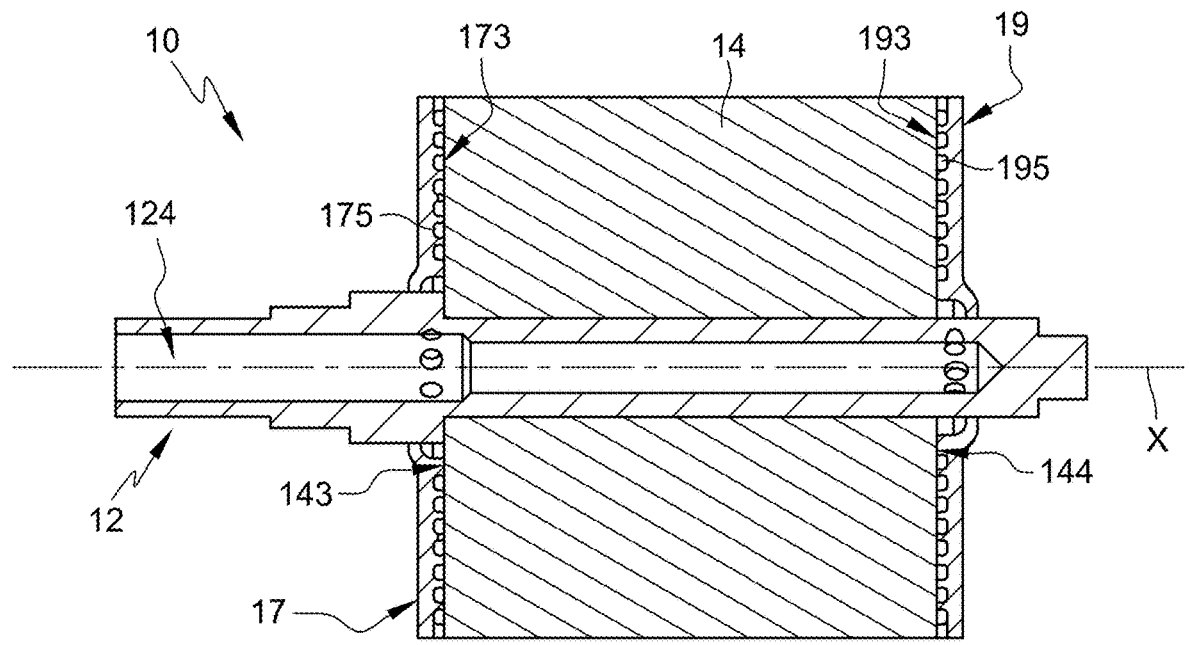
FIG. 1 is a longitudinal sectional view of a rotor according to a first embodiment of the invention.
Figure 5:
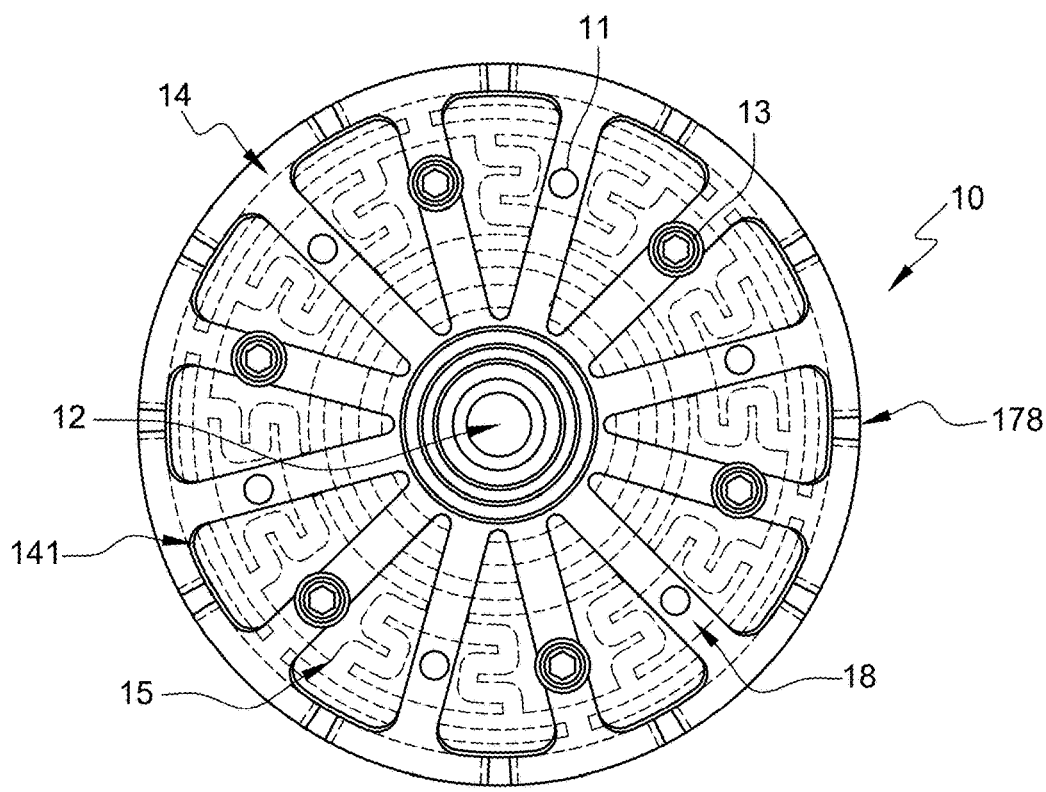
FIG. 5 is a rear axial view of the rotor according to FIG. 1, the rear flange having been withdrawn.

FIG. 1 represents a rotor 10 according to a first embodiment of the invention. The rotor 10 comprises a substantially cylindrical body formed by a lamination stack 14 consisting of a ferromagnetic material, in particular steel, said body being secured in rotation to a shaft 12 rotatably mounted about an axis X. As illustrated on FIG. 5, the rotor 10 further comprises a plurality of permanent magnets 15 intended to be housed in a plurality of internal cavities 141 formed inside the lamination stack 14, each of the internal cavities 141 housing at least one permanent magnet 15. The magnets 15 can be made of ferrite for example. The cavities 141 extend in a radial direction with respect to the axis X and are axially through cavities. They have a substantially triangular section and are uniformly distributed about the axis X. Two directly adjacent cavities 141 are separated by a radial segment 18 from the lamination stack 14 so that the body of the rotor consists of an alternation of cavities 141 and segments 18 when following a circumference of the rotor 10. The magnets 15 have orthoradial magnetization, that is to say that the two end faces of each magnet 15 which are adjacent to each other in the orthoradial direction are magnetized so as to be able to generate a magnetic flux following an orientation orthoradial with respect to the axis X.

The lamination stack 14 is formed from an axial pile of laminations which extend in a radial plane perpendicular to the axis X of the shaft 12 or of a lamination rolled up on itself (Slinky lamination). The lamination stack 14 is coaxially mounted on the shaft 12. The shaft 12 can be fitted by force inside a central aperture of the lamination stack 14 so as to bind in rotation the body of the rotor with the shaft 12. A plurality of fastening holes 11 are made in the lamination stack 14 to allow the passage of fastening screws 13 intended to fasten end flanges 17, 19 on the lamination stack 14. Thus, a first end of the screws bears against the external face of a rear end flange 19, while the other end of the screws protrudes from the external face of a front end flange 17 and is threaded so as to receive a nut which, once screwed, exerts pressure against said external face. Thus, the lamination stack 14 is axially clamped between the front end flange 17 and the rear end flange 19. These flanges 17, 19 can advantageously make it possible to ensure a balancing of the rotor 10 while allowing a good maintenance of the magnets 15 inside the internal cavities 141. The balancing of these flanges may be carried out by adding or removing material. The removal of material may be carried out by machining, while the addition of material can be carried out by implanting elements in apertures provided for this purpose and distributed along the circumference of the flange 17, 19.

Figure 2:
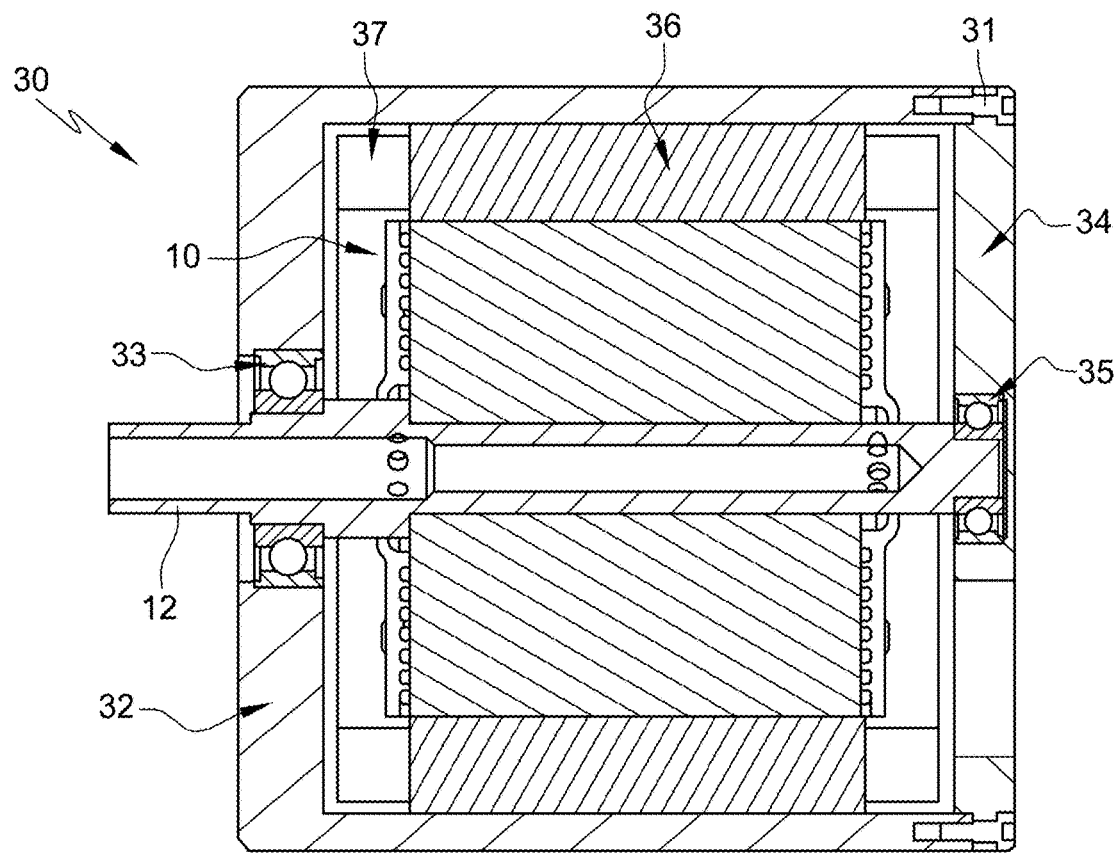
FIG. 2 is a longitudinal sectional view of an electric motor incorporating the rotor according to FIG. 1.

Referring to FIG. 2, there is shown an electric motor 30 equipped with the rotor 10 of FIG. 1. This electric motor 30 comprises in particular a casing in two parts housing the rotor 10 and an annular stator 36 which surrounds the rotor 10 coaxially to the shaft 12. The casing comprises in particular a front bearing 32 and a rear bearing 34 connected to each other by means of fastening screws 31. The bearings 32, 34 have a hollow shape and each centrally carry a ball bearing, respectively 33 and 35, for the rotational mounting of the shaft 12. Winding heads 37 project axially on either side from the stator body 36 and are housed in the intermediate space separating the stator 36 from the respective bearings 32, 34. The front and rear bearings 32, 34 will advantageously be made of metal.

Figure 3:
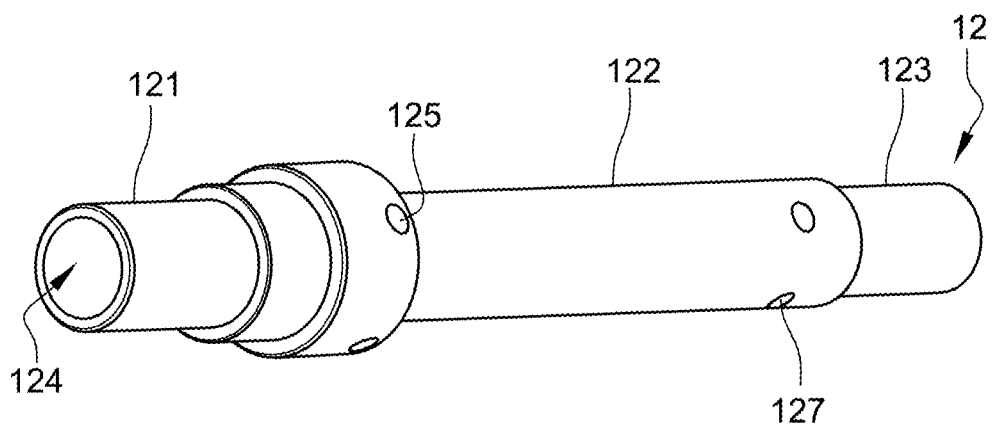
FIG. 3 is a perspective view of the shaft used in the rotor of FIG. 1.
Figure 4:
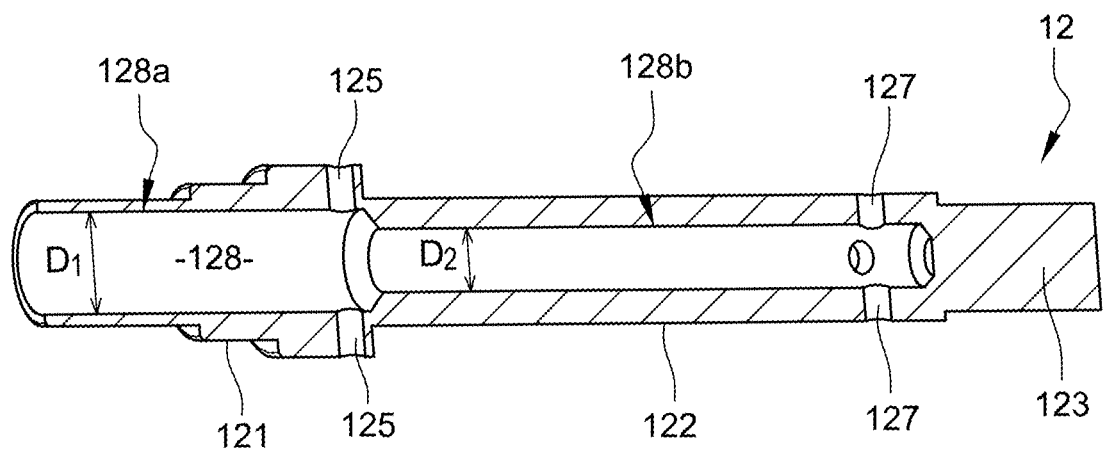
FIG. 4 is a longitudinal sectional view of the shaft of FIG. 3.

Referring to FIGS. 3 and 4, there is shown the shaft 12 with which the rotor of FIG. 1 is equipped. This shaft 12 comprises a main body formed from a front end portion 121 and a rear end portion 123, said end portions 121, 123 being separated by a central portion 122. The main body is provided with a blind hole 128 aligned along the axis X of the shaft 12. This blind hole 128 comprises two contiguous sections with different internal diameters, namely a first section 128a having an internal diameter D1 and a second section 128b having an internal diameter D2. Thus configured, the shaft 12 has an internal channel 124, called an inlet channel, through which a coolant intended to cool the rotor 10 can be conveyed. The inlet channel 124 is formed jointly by the first section 128a and by the second section 128b of the blind hole 128. Furthermore, the shaft 12 is provided with several holes 125 radially oriented with respect to the axis X of the shaft 12, said holes 125 being formed inside the front end portion 121 so as to open, on one side, into the inlet channel 124 and, on the other side, at the peripheral wall of the shaft. Similarly, several holes 127 radially oriented with respect to the axis X of the shaft 12 are formed inside the central portion 122 so as to open, on one side, into the inlet channel 124 and, on the other side, at the peripheral wall of the shaft.

Figure 6:
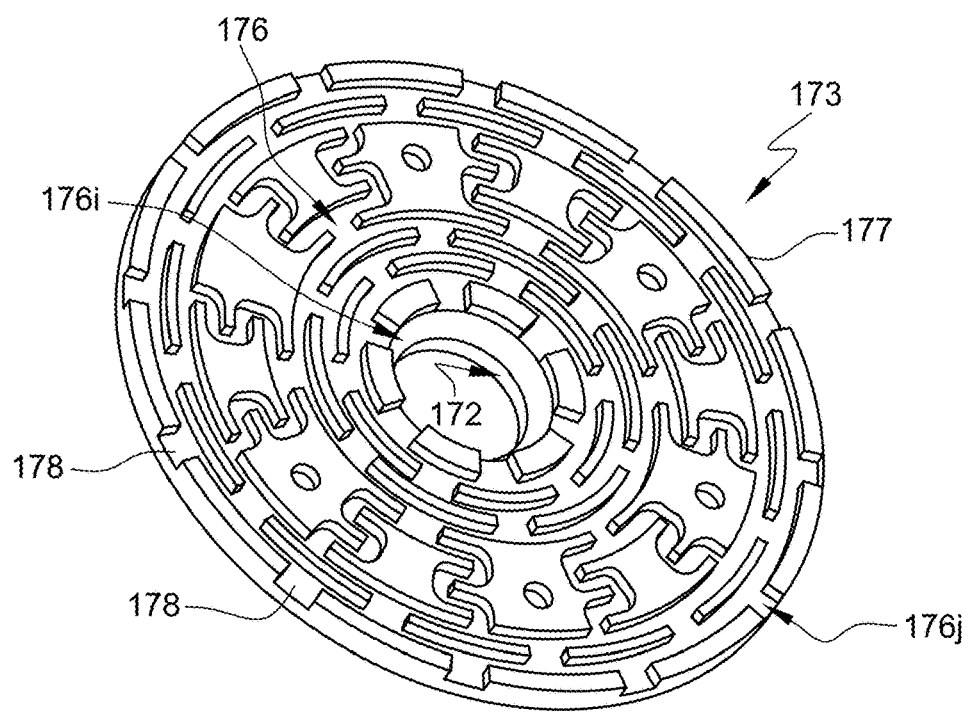
FIG. 6 is a perspective view of the internal face of the front flange used in the rotor of FIG. 1.
Figure 7:
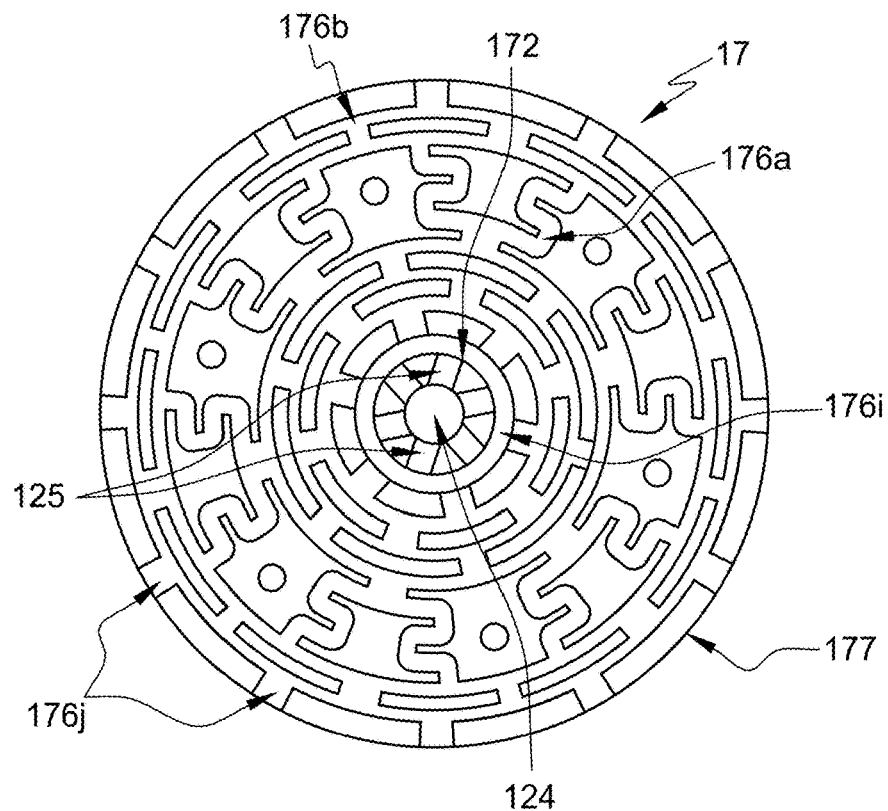
FIG. 7 is an axial view of the internal face of the flange of FIG. 6.

Referring to FIGS. 6 and 7, there is shown the front flange 17 with which the rotor 10 of FIG. 1 is equipped. The rear flange 19 having a structure substantially identical to the front flange 17, the technical details given below will apply so similar to the rear flange 19.

The front flange 17 is substantially in the form of a disc comprising in particular an external face (not shown) and an internal face 173. The internal face 173 is in contact with the front lateral face 143 of the lamination stack 14 (the internal face 193 of the rear flange 19 is however in contact with the rear lateral face 144 of the lamination stack 14). The internal face 173 is provided with a groove 176 radially extending from a recessed central region 172 of said flange to a peripheral face 177 of said flange. The groove 176 is configured to form with the corresponding lateral face 143 of the lamination stack 14 a circulation channel for the coolant, called a front outlet channel 175. In the case of the rear flange 19, a similar groove allows in the same way to define a rear outlet channel 195.

As represented on FIG. 7, the central region 172 of the flange has a profile complementary to the shaft 12 such that the shaft 12 is housed without play in said central region 172. The groove 176 extends from a ring-shaped proximal end 176i, on which the radial holes 125 of the shaft 12 open, to several distal ends 176j, forming apertures 178 through the peripheral face 177 of the flange 17. In the mounted position of the electric motor 30 represented on FIG. 2, these distal ends 176j face the winding heads 37. The groove 176 is also formed by a succession of contiguous radial segments 176a and orthoradial segments 176b. These segments 176a, 176b advantageously define a baffle profile which makes it possible to increase the path to be traveled by the coolant during its circulation in the front outlet channel 175 compared to a path which would be radially direct between the central region 172 and the peripheral face 177 of said flange. As illustrated in FIG. 6, this profile also makes it possible to optimize the contact surfaces between the front outlet channel 175 and the permanent magnets 15 housed in the lamination stack 14.

Thus configured, the rotor 10 and the motor 30 can be cooled by a coolant, such as oil for example, said coolant circulating in the rotor successively through the inlet channel 124, then between the front and rear flanges 17, 19 and the front and rear lateral faces 143, 144 of the lamination stack 14 respectively through the front and rear outlet channels 175, 195, to finally be expelled from the rotor 10 through the apertures 178. Subsequently, this coolant is directed towards the winding heads 37 so that, once in contact with the winding heads 37, it can extract part of the heat stored in said winding heads 37. The coolant then circulates, under the effect of the gravity, in the lower part of the casing before being discharged via a discharge aperture.

Figure 8:
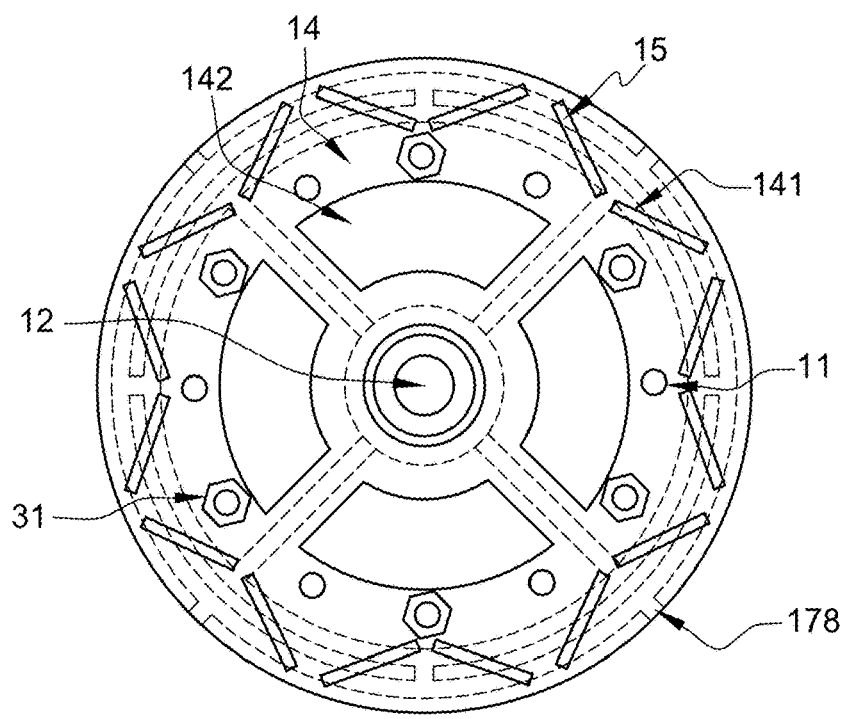
FIG. 8 is a rear axial view of a rotor according to a second embodiment of the invention, the rear flange having been withdrawn.

FIG. 8 is a rear axial view of a rotor 10 according to a second embodiment of the invention. This second embodiment differs mainly from the first embodiment described above by the profile of the groove 176 formed in each of the front and rear flanges 17 and 19, as well as by the nature and arrangement of the permanent magnets 15 in the lamination stack 14.

In particular, the permanent magnets 15 have a parallelepipedic shape with rectangular section and are substantially aligned in two planes perpendicular to the axis X of the shaft 12, each of said planes being aligned with one of the front and rear lateral faces 143, 144 of the lamination stack 14. The magnets 15 are evenly distributed about the axis X and are disposed in such a way as to form a multi-arm star pattern. The magnets 15 can be made of rare earth, for example. The lamination stack 14 can in particular comprise a plurality of second internal cavities 142 axially traversing and extending along a direction radial with respect to the axis X. These second internal cavities 142 can make it possible to house acoustic absorption elements inside the lamination stack. In the embodiment shown, these second internal cavities 142 are four in number and each have a section in the shape of a portion of a ring. They are evenly distributed about the axis X so as to avoid creating an imbalance in the rotor.

Figure 9:
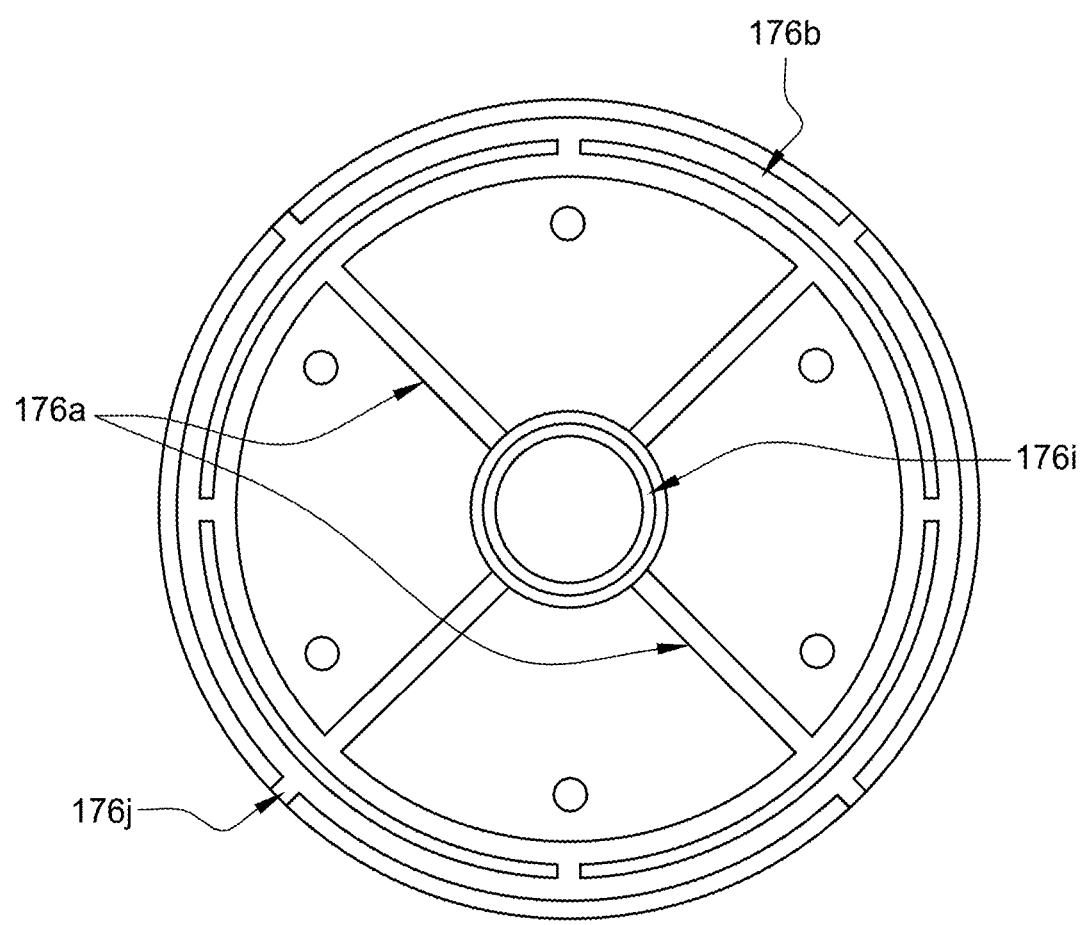
FIG. 9 is an axial view of the internal face of the front flange used in the rotor of FIG. 8.

Referring to FIG. 9, there is shown the front flange 17 with which the rotor 10 of FIG. 8 is equipped. The rear flange 19 having a structure substantially identical to the front flange 17, the technical details given below will apply in a similar manner to the rear flange 19.

As shown in FIG. 9, the internal face 173 of the front flange 17 is provided with a groove 176 which extends from a proximal end 176i, on which the radial holes 125 of the shaft 12 open, to several distal ends 176j, forming the apertures 178 through the peripheral face 177 of the flange 17 through which the coolant can be expelled. As for the previous configuration, these distal ends 176j face the winding heads 37. The groove 176 is formed by a succession of contiguous radial segments 176a and orthoradial segments 176b. These segments 176a, 176b advantageously define a baffle profile which makes it possible to lengthen the path to be traveled by the coolant during its circulation in the front outlet channel 175 with respect to a path which would be radially direct between the central region 172 and the peripheral face 177 of said flange. As illustrated on FIG. 8, this profile also makes it possible to circulate more coolant in the regions of the front flange 17 which directly face the permanent magnets 15 housed in the lamination stack 14.

The invention is obviously not limited to the embodiments as described previously. In particular, in other embodiments (not shown) of the invention, the flanges 17, 19 can also be provided with several grooves 176 separated from each other so that the coolant cannot circulate between the grooves through the flanges. Each of the grooves 176 can advantageously extend radially from the recessed central region of the flanges, at which each of the grooves will be in fluid communication with the inlet channel 124, to the peripheral face of said flanges at a single outlet aperture. This outlet aperture will advantageously be axially aligned with the winding heads 37 of the stator 36 so as to allow said winding heads 37 to be cooled by means of the coolant expelled from the rotor through said outlet aperture.

The invention claimed is:

1. A rotor for an electric motor comprising:
   a rotor shaft rotatably mounted about an axis;
   a lamination stack coaxially mounted on the rotor shaft, the lamination stack extending between a front lateral face and a rear lateral face and comprising first internal cavities;
   a plurality of permanent magnets housed inside the first internal cavities of the lamination stack;
   a front flange coaxially mounted on the rotor shaft and axially arranged on a front side of the lamination stack so as to be contiguous to the front lateral face of the lamination stack and a disc-shaped rear flange coaxially mounted on the rotor shaft and axially arranged on a rear side of the lamination stack so as to be contiguous to the rear lateral face of the lamination stack;
   wherein the shaft is provided with at least one internal channel for circulating a coolant, called an inlet channel, wherein the front flange is configured to form with the front lateral face of the lamination stack at least one front outlet channel inside which the coolant may circulate, the at least one front outlet channel being in fluid communication with the inlet channel, and opening at at least one outlet aperture located at an external periphery of the front flange and wherein the disc-shaped rear flange is configured to form with the rear lateral face of the lamination stack at least one rear outlet channel inside which the coolant may circulate, the at least one rear outlet channel being in fluid communication with the inlet channel, and opening at at least one outlet aperture located at an external periphery of the disc-shaped rear flange.

2. The rotor according to claim 1, wherein the shaft comprises a hollow front end portion and a solid rear end portion separated from the front end portion by a hollow central portion, the hollow front end portion and the hollow central portion being traversed by a cylindrically-shaped central cavity, the cylindrically-shaped central cavity forming the inlet channel of the shaft wherein at least one hole oriented radially with respect to the axis of the shaft is formed inside the hollow front end portion so as to open, on one side, into the inlet channel and, on an other side, into the at least one front outlet channel and wherein at least one hole oriented radially with respect to the axis of the shaft is formed inside the hollow central portion so as to open, on one side, into the inlet channel and, on an other side, into the at least one rear outlet channel.

3. The rotor according to claim 2, wherein the shaft comprises a main body provided with a blind hole aligned along the axis of the shaft, the blind hole comprising two contiguous sections with different internal diameters, namely a first section having a first internal diameter and a second section having a second internal diameter, the inlet channel of the shaft being jointly defined by the first section and by the second section of the blind hole.

4. The rotor according to claim 1, wherein the front flange and the disc-shaped rear flanges each have an internal face in contact with a corresponding one of the front lateral face and the rear lateral face of the lamination stack, the internal face being provided with at least one groove radially extending from a recessed central region of the front flange and the disc-shaped rear flange, at which the at least one groove is in fluid communication with the inlet channel of the shaft, to a peripheral face of the front flange and the disc-shaped rear flange, the at least one groove forming with the corresponding one of the front lateral face and the rear lateral face of the lamination stack the at least one front outlet channel or the at least one rear outlet channel.

5. The rotor according to claim 4, wherein the at least one groove has a specific profile allowing the at least one groove to optimize contact surfaces between the at least one front outlet channel and the plurality of permanent magnets housed in the first internal cavities of the lamination stack, or between the at least one rear outlet channel and the plurality of permanent magnets housed in the first internal cavities of the lamination stack.

6. The rotor according to claim 4, wherein the at least one groove is formed by a succession of contiguous radial and orthoradial segments, the succession of contiguous radial and orthoradial segments defining a baffle profile intended to increase a path to be traveled by the coolant during its circulation in the at least one front outlet channel with respect to a path which would be radially direct between the recessed central region and the peripheral face of the front flange or during its circulation in the at least one rear outlet channel with respect to a path which would be radially direct between the recessed central region and the peripheral face of the disc-shaped rear flange.

7. The rotor according to claim 4, wherein the internal face of the front flange is provided with a plurality of grooves radially extending from a recessed central region of the front flange at which the plurality of grooves are in fluid communication with the inlet channel of the shaft, to a peripheral face of the front flange the plurality of grooves forming with the front lateral face of the lamination stack a plurality of front outlet channels, and wherein the internal face of the disc-shaped rear flange is provided with a plurality of grooves radially extending from a recessed central region of the disc-shaped rear flange, at which the plurality of grooves are in fluid communication with the inlet channel of the shaft, to a peripheral face of the disc-shaped rear flange, the plurality of grooves forming with the rear lateral face of the lamination stack a plurality of rear outlet channels.

8. The rotor according to claim 7, wherein each of the plurality of grooves faces a radial hole formed through the shaft, the radial hole opening, on one side, onto the inlet channel of the shaft and, on an other side, onto a peripheral wall of the shaft.

9. The rotor according to claim 1, wherein the plurality of permanent magnets are made of ferrite.

10. The rotor according to claim 1, wherein the plurality of permanent magnets are made of rare earth.

11. The rotor according to claim 1, wherein at least one of the front flange and the disc-shaped rear flanges are produced from plastic.

12. An electric motor comprising a rotor according to claim 1 and an annular stator which surrounds the rotor coaxially to the shaft, winding heads axially projecting on either side of the annular stator, wherein the at least one outlet aperture located at the external periphery of the front flange or the or at least one outlet aperture located at the external periphery of the disc-shaped rear flange or the at least one outlet aperture located at the external periphery of the front flange and the at least one outlet aperture located at the external periphery of the disc-shaped rear flange, through which the coolant of the front flange and the disc-shaped rear flanges exits, is axially aligned with the winding heads so as to allow cooling of the winding heads by means of the coolant.

13. The rotor according to claim 5, wherein the at least one groove is formed by a succession of contiguous radial and orthoradial segments, the succession of contiguous radial and orthoradial segments defining a baffle profile intended to increase a path to be traveled by the coolant during its circulation in the at least one front outlet channel with respect to a path which would be radially direct between the recessed central region and the peripheral face of the front flange or during its circulation in the at least one rear outlet channel with respect to a path which would be radially direct between the recessed central region and the peripheral face of the disc-shaped rear flange.

14. The rotor according to claim 5, wherein the internal face of the front flange is provided with a plurality of grooves radially extending from a recessed central region of the front flange at which the plurality of grooves are in fluid communication with the inlet channel of the shaft, to a peripheral face of the front flange the plurality of grooves forming with the front lateral face of the lamination stack a plurality of front outlet channels and wherein the internal face of the disc-shaped rear flange is provided with a plurality of grooves radially extending from a recessed central region of the disc-shaped rear flange, at which the plurality of grooves are in fluid communication with the inlet channel of the shaft, to a peripheral face of the disc-shaped rear flange, the plurality of grooves forming with the rear lateral face of the lamination stack a plurality of rear outlet channels.

15. The rotor according to claim 6, wherein the internal face of the front flange is provided with a plurality of grooves radially extending from a recessed central region of the front flange at which the plurality of grooves are in fluid communication with the inlet channel of the shaft, to a peripheral face of the front flange the plurality of grooves forming with the front lateral face of the lamination stack a plurality of front outlet channels and wherein the internal face of the disc-shaped rear flange is provided with a plurality of grooves radially extending from a recessed central region of the disc-shaped rear flange, at which the plurality of grooves are in fluid communication with the inlet channel of the shaft, to a peripheral face of the disc-shaped rear flange, the plurality of grooves forming with the rear lateral face of the lamination stack a plurality of rear outlet channels.

16. The rotor according to claim 13, wherein the internal face of the front flange is provided with a plurality of grooves radially extending from a recessed central region of the front flange at which the plurality of grooves are in fluid communication with the inlet channel of the shaft, to a peripheral face of the front flange the plurality of grooves forming with the front lateral face of the lamination stack a plurality of front outlet channels and wherein the internal face of the disc-shaped rear flange is provided with a plurality of grooves radially extending from a recessed central region of the disc-shaped rear flange, at which the plurality of grooves are in fluid communication with the inlet channel of the shaft, to a peripheral face of the disc-shaped rear flange, the plurality of grooves forming with the rear lateral face of the lamination stack a plurality of rear outlet channels.

17. The rotor according to claim 16, wherein each of the plurality of grooves faces a radial hole formed through the shaft, the radial hole opening, on one side, onto the inlet channel of the shaft and, on an other side, onto a peripheral wall of the shaft.

18. The rotor according to claim 17, wherein the plurality of permanent magnets are made of ferrite.

19. The rotor according to claim 18, wherein at least one of the front flange and the disc-shaped rear flanges are produced from plastic.

20. The rotor according to claim 18, wherein the plurality of permanent magnets are made of rare earth.

* * * * *